United States Patent [19]
Bridigum

[11] 3,918,850
[45] Nov. 11, 1975

[54] VIBRATION-ABSORBING SUPPORT FRAME FOR RAILWAY VEHICLE MOTOR-COMPRESSOR UNIT

[75] Inventor: Robert J. Bridigum, Pittsburgh, Pa.

[73] Assignee: Westinghouse Air Brake Company, Wilmerding, Pa.

[22] Filed: Dec. 23, 1974

[21] Appl. No.: 535,735

[52] U.S. Cl. .................. 417/363; 62/295; 248/18
[51] Int. Cl.² ...................................... F16F 15/00
[58] Field of Search .......... 62/295; 417/363; 248/18

[56] References Cited
UNITED STATES PATENTS

| | | | |
|---|---|---|---|
| 1,139,158 | 5/1915 | Boerries | 248/18 |
| 1,808,939 | 6/1931 | Summers | 248/18 |
| 1,862,816 | 6/1932 | Braeutigam | 248/18 X |
| 2,361,768 | 10/1944 | Heintz | 248/18 X |
| 2,930,556 | 3/1960 | Horlacher | 62/295 X |
| 3,006,159 | 10/1961 | Brown | 62/295 |

Primary Examiner—Alan Cohan
Attorney, Agent, or Firm—R. W. McIntire, Jr.

[57] ABSTRACT

A mounting frame for resiliently supporting a railway vehicle motor-compressor unit on the vehicle, said mounting frame including a torque tube member to which the motor-compressor unit is mountingly connected for dissipating torque pulsations generated by the reciprocating piston action of the compressor. Advantage may be taken of the tubular structure by employing several of the tubular members in transmitting compressed air from the high pressure outlet of the compressor to the aftercooler which is also carried by the support frame.

7 Claims, 2 Drawing Figures

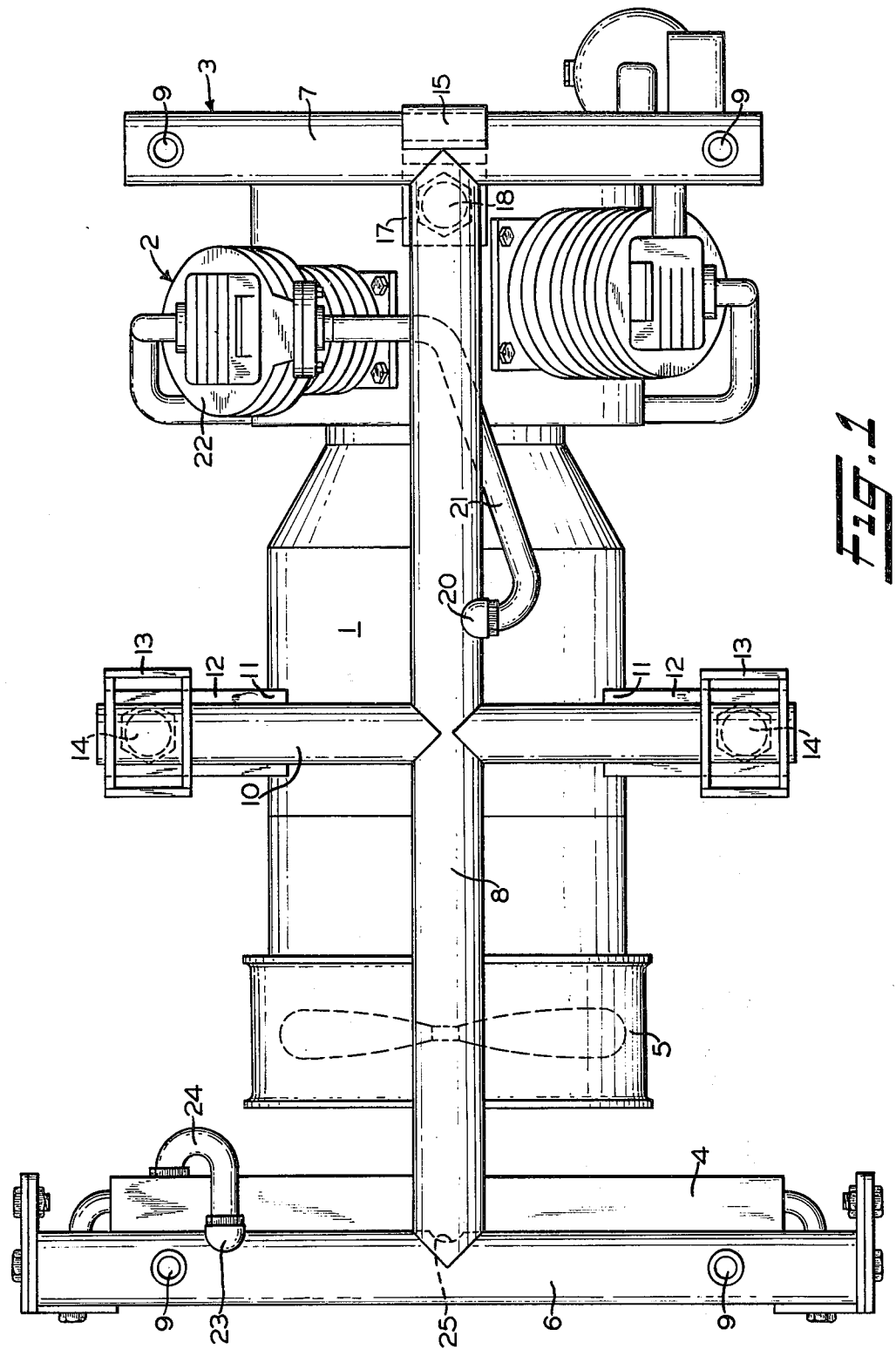

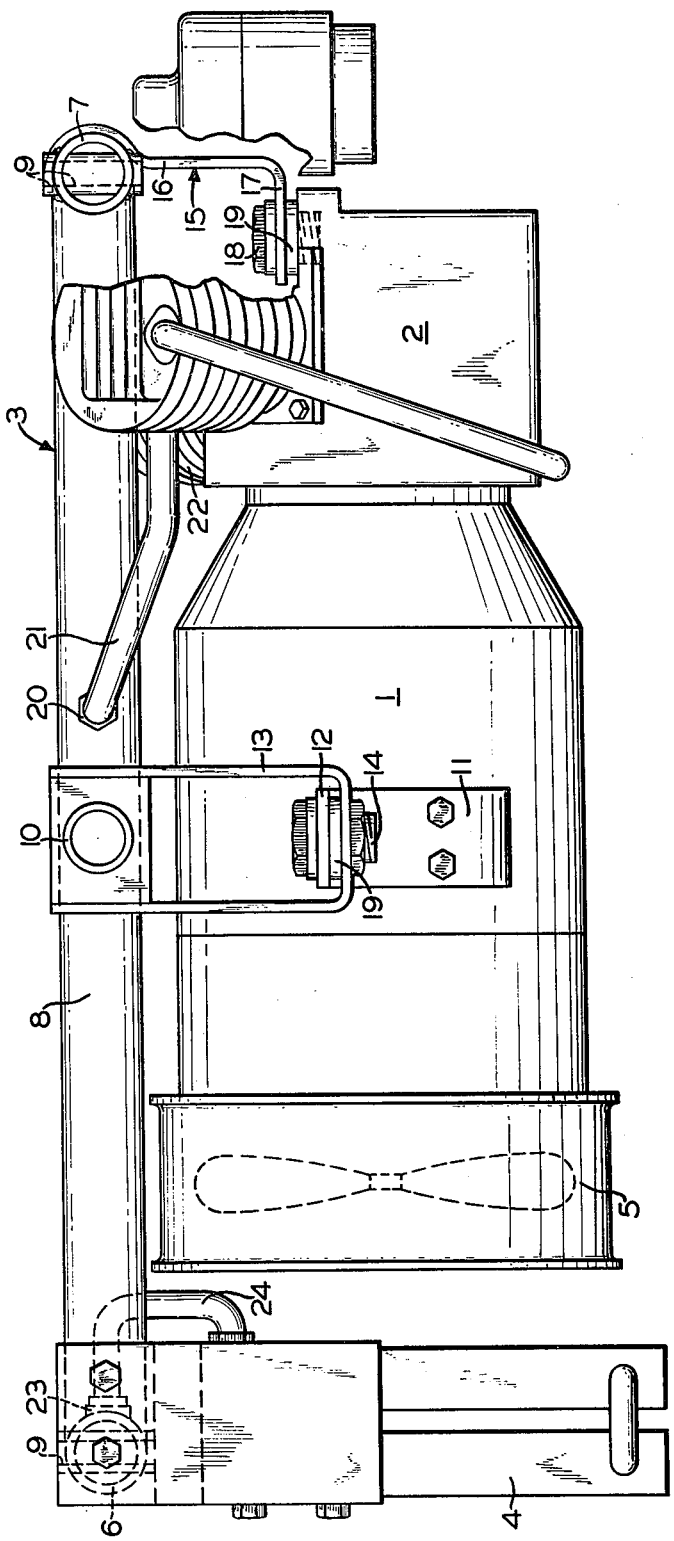

VIBRATION-ABSORBING SUPPORT FRAME FOR RAILWAY VEHICLE MOTOR-COMPRESSOR UNIT

BACKGROUND OF THE INVENTION

Present mounting frames by which motor-compressor units of rapid transit railway vehicles, for example, are supported on the underside of the vehicle, normally are constructed of angle iron members of sufficient strength for supporting the weight of the motor-compressor unit. Notwithstanding that resilient mounting pads are interposed at critical weight support points between the frame and the motor-compressor unit, such resilient pads, due to the rigid characteristic of the frame itself, are inadequate for absorbing and dissipating the torque pulsations generated by the piston action of the compressor during operation thereof. The pulsations, therefore, are transmitted through the support frame and the vehicle floor to the passenger compartment, thereby creating an undesirable effect on the passengers.

SUMMARY OF THE INVENTION

The object of the present invention, therefore, is to provide a support frame for a motor-compressor unit of a railway vehicle sufficiently strong for supporting the motor-compressor unit but also characterized by such flexibility as to cause the vibrations of the compressor to be dissipated or dampened without affecting the passenger compartment.

Basically, the invention comprises a support frame for a motor-compressor unit of a railway vehicle of the rapid transit type, for example, said support frame being constructed of tubular members such as pipes rather than the conventional angle iron structure. A longitudinal segment of pipe interconnecting a pair of fixed parallel, spaced-apart pipe segments, which are mountable to the car underframe, serves as a torque tube at the mid-point of which is firmly connected the midpoint of a transverse pipe segment having the motor-compressor unit resiliently suspended thereon. The torque tube thus is able to absorb and dissipate the pulsations of the compressor unit by its resistance to twisting. Conventional rubber insulator pads are also interposed between the motor-compressor unit and the transverse pipe segment for further absorption of vibrations.

The pipe construction of the support frame further lends itself to use in transmitting, via portions thereof, compressed air from the compressor discharge to the aftercooler and drain valve.

In the drawings,

FIG. 1 is a plain view, in outline, showing a motor-compressor unit mounted on a support frame embodying the invention; and FIG. 2 is an elevational view, in outline, of the motor-compressor unit mounted on the support frame shown in FIG. 1.

DESCRIPTION AND OPERATION

In FIGS. 1 and 2 is shown an electric motor 1 for driving an air compressor 2 both of which comprise a motor-compressor unit carried by a support frame 3 comprising the present invention. An aftercooler 4 is also carried by the support frame 3 at the end opposite compressor 2, said aftercooler being subjected to the cooling effect of a fan coaxially operably disposed on the adjacent end of motor 1, said fan being hidden in the drawing by an outer protective shield 5 and, therefore, shown in broken outline.

Support frame 3 and the motor-compressor unit are normally mounted on the underframe of a railway car in either transverse or parallel relation to the axis of the car depending upon the type of car and the availability of space.

Support frame 3 comprises two parallel, tubular end members 6 and 7 rigidly secured to the underframe (not shown) of the car, and having secured at their respective mid-points the respective ends of a transversely disposed single length tubular torque member 8, thus forming an I-shaped tubular support frame. The tubular end members are each provided at their respective ends with drill holes 9 by which support frame 3 may be secured to the underframe (not shown) of the car. The several tubular members 6, 7, and 8 may be made from extra heavy steel pipe of sufficient diametral dimension and strength to support the weight of the motor-compressor unit. For example, if the motor-compressor unit weighs on the order of 850 pounds, the support frame 3 could be constructed of extra heavy steel pipe on the order of 2 inch O. D.

An intermediate transverse tubular suspension member 10 disposed parallel to end members 6 and 7 comprises two axially aligned sections of equal length having the inner ends thereof rigidly secured to torque member 8 intermediate the ends of the torque member, while the outer ends of said transverse member remain unattached. The several tubular members 6, 7, 8, and 10 may be secured to each other at their junctures by any suitable means, but welding of said junctures has been found to be preferable for reasons to be hereinafter disclosed.

Aftercooler 4 is suspended from end member 6, whereas the motor-compressor unit is supported at and suspended from the ends of intermediate member 10 and the mid-point of end member 7 in a manner to be now described.

As shown in the drawings, a pair of angular side brackets 11 are secured on opposite sides of motor 1, each of said brackets having an arm 12 extending horizontally away from the motor parallel to intermediate tubular member 10. A U-shaped suspension bracket 13 is fixed by any suitable means and suspended from each end of intermediate tubular member 10 such that the ends of horizontal arms 12 of brackets 11 may rest on the bottoms of said U-shaped brackets, respectively (as best seen in FIG. 2), thus primarily supporting the weight of motor 1 thereon. The free ends of horizontal arms 12 may be secured to the U-shaped brackets 13 by suitable means such as bolts 14. Any alternative suitable means, in addition to that immediately above described, may be employed, if desired, for supporting the motor portion 1 of the motor-compressor unit on suspension member 10. Suspension member 10 and complementing brackets 11 and 13 should all be disposed relative to each other and to the motor-compressor unit so that the weight support points provided by said suspension member and brackets preferably lie within a plane transverse to and located substantially intermediate the opposite ends of the longitudinal axis of the motor-compressor unit.

An L-shaped end bracket 15 comprises a vertical arm 16 having the upper end thereof fixed to and suspended from the mid-point of tubular end member 7, and a horizontal arm 17 extending therefrom perpendicularly to said end member toward the compressor 2. Compressor 2 is attached by suitable means such as a bolt 18 to the free end of horizontal arm 17 thus supporting primarily the weight of said compressor.

Since motor 1 and compressor 2 are rigidly connected to each other to form the motor-compressor unit, support of the combined weight of said motor and compressor is distributed among the three brackets 11 and 15.

A resilient vibration-absorbing insulator member 19, such as a relatively heavy rubber washer-shaped pad, is disposed between each of the bracket members 13 and the horizontal arms 12 of brackets 11, and between compressor 2 and horizontal arm 12 of bracket 15, respectively (as best seen in FIG. 2), for absorbing vibrations due to pulsations of compressor 2.

When the motor-compressor unit is in operation, vibrations resulting from pulsating action of the pistons (not shown) of compressor 2 are effectively dissipated jointly by the resilient pads 19 and tubular torque member 8, which, because of its tubular construction provides a limited amount of angular flexibility about its axis and thereby permits sufficient distortion thereof about said axis for absorbing said vibrations.

Since the several members comprising support frame 3, in particular end member 6 and torque member 8, are made of tubular pipe, as above noted, advantage can be taken of such structure in transmitting compressed air from compressor 2 to aftercooler 4 without providing separate piping for said purpose.

Torque tube 8 may be tapped at any convenient location, such as at 20 for example, where one end of a tube 21 is connected, the other end of said tube being connected to the discharge of a high pressure cylinder 22 of compressor 2. End member 6 of support frame 2 may also be tapped at any convenient location, such as at 23 for example, where one end of a tube 24 is connected, the other end of said tube being connected to the inlet of aftercooler 4. Thus, compressed air may flow from the high pressure cylinder 22 of compressor 2 to aftercooler 4 via tube 21, tubular torque member 8, and tube 24.

In order to utilize tubular members 6 and 8 for transmitting compressed air from compressor 2 to aftercooler 4, said tubular members must be made air-tight at their junctures or other locations. Member 6 must be sealed at both ends while the juncture of member 8 with said member 6 must also be sealingly joined. Member 6 is also provided, at its juncture with member 8, with an opening 25 (see FIG. 1) to permit communication between said members 6 and 8. The juncture of member 8 with end member 7 is also sealingly joined therewith to prevent leakage of compressed air therepast. Welding the junctures of member 8 with end members 6 and 7, as hereinbefore mentioned, provides the desired sealing effect needed at said junctures.

Having now described the invention what I claim as new and desire to secure by Letters Patent, is:

1. The combination of a motor-compressor unit for a railway vehicle and a support frame for mounting said motor-compressor unit to the underframe of the vehicle, said support frame comprising:
  a. a pair of fixed parallel, spaced-apart end members for securing said support frame to the underframe of the vehicle;
  b. a torque member extending from one of said end members to the other with its opposite ends rigidly secured to the end members, respectively, said torque member possessing limited, resilient, angular flexibility about its longitudinal axis; and
  c. a suspension member rigidly secured at a point intermediate its opposite ends to said torque member intermediate the ends thereof and in transverse relation thereto,
  d. said motor-compressor unit being resiliently supported by said opposite ends of said suspension member via which vibrations of said motor-compressor unit are transmitted to said torque member and dissipated thereby.

2. The combination, as set forth in claim 1, wherein said parallel members, said torque member, and said suspension member are of tubular structure.

3. The combination, as set forth in claim 1, wherein said suspension member is provided with suspension brackets disposed on each of the opposite ends thereof, and said motor-compressor unit is provided with a pair of side brackets disposed on diametrally opposite sides thereof in complementary relation and connectible to said suspension brackets, respectively.

4. The combination, as set forth in claim 3, wherein said suspension brackets and said side brackets provide a pair of weight support points lying within a plane transverse to and located substantially intermediate the opposite ends of the longitudinal axis of said motor-compressor unit.

5. The combination, as set forth in claim 3, further characterized by respective resilient elements interposed between said suspension brackets and said side brackets.

6. The combination, as set forth in claim 3, wherein said motor-compressor unit comprises an air compressor axially aligned with and operably connected to a driving motor therefor, and further characterized by an end bracket secured to said compressor and to one of said end members adjacent said compressor for providing a third weight support point, and a resilient element interposed between said end bracket and said compressor.

7. The combination, as set forth in claim 6, further characterized by an aftercooler secured to and supported by the other of said end members opposite said one of said end members, said end members also being of tubular construction and said air compressor having a high pressure outlet connected via said torque member and said other of said end members to said aftercooler.

* * * * *